United States Patent
Gagliani

[15] 3,673,289
[45] June 27, 1972

[54] QUENCHING INJECTION MOLDED POLYCARBONATE PARTS FOR FATIGUE RESISTANCE

[72] Inventor: John Gagliani, Rochester, Minn.

[73] Assignee: International Business Machines Corporation, Armonk, N.Y.

[22] Filed: Jan. 28, 1970

[21] Appl. No.: 6,977

[52] U.S. Cl............................264/28, 264/237, 264/348
[51] Int. Cl..........................................................B29c 25/00
[58] Field of Search..................264/237, 348, 178, 328, 346, 264/336, 28

[56] References Cited

UNITED STATES PATENTS

| | | | |
|---|---|---|---|
| 3,057,013 | 10/1962 | Loveless | 264/178 |
| 3,155,756 | 11/1964 | Hechelhammer et al. | 264/178 |
| 3,200,182 | 8/1965 | Hechelhammer et al. | 264/346 |
| 3,553,303 | 1/1971 | Zavasnik | 264/237 |

OTHER PUBLICATIONS

Raff et al.; "Crystalline Olefin Polymers" Part II; Interscience Pub. 1964; TP1180.P65R3 pages 29–32.
Christopher et al.; "Polycarbonates" Reinhold 1962; TP156P6C4 pages 93 & 94.

Primary Examiner—Julius Frome
Assistant Examiner—Arthur H. Koeckert
Attorney—Hanifin and Jancin and Robert w. Lahtinen

[57] ABSTRACT

A process for the production of void free enhanced impact fatigue strength polycarbonate parts wherein parts are molded in a heated die and immediately after the molding cycle quenched in a liquid bath such as ice water.

3 Claims, No Drawings

QUENCHING INJECTION MOLDED POLYCARBONATE PARTS FOR FATIGUE RESISTANCE

BACKGROUND OF THE INVENTION

This invention relates generally to polycarbonate plastics and more particularly to a method for making shaped polycarbonate articles having enhanced impact fatigue strength.

The substitution of plastic for metal in many structural applications is desirable since significant savings can be realized by molding complex shapes rather than using multiple machining operations. To provide an adequate alternative; however, the plastic material must possess comparable physical characteristics. Moldable polycarbonate plastics have good temperature stability and good impact strength as required for structural members. In addition a structural member such as a machine part should possess excellent impact fatigue strength characteristics to assure that the part will possess a satisfactory service life in the environment for which it is designed.

The present invention utilizes the technique of molding polycarbonate parts in a mold which is maintained at an elevated temperature and immediately quenching the molded part in ice water upon removal from the mold cavity. Using an elevated mold temperature it is possible to eliminate vacuum voids in the formed part. The presence of voids is more prevalent at lower mold temperatures and in portions of a part having larger cross sectional dimensions.

When formed at the elevated temperature, the part immediately upon removal from the cavity is immersed in ice water, and quenched for a period calculated to reduce the temperature throughout the part. The impact fatigue characteristic of polycarbonate parts so processed was significantly enhanced and a like improvement, although of lesser magnitude, occurs in certain filled polycarbonate parts. When polycarbonate parts filled with 30% chopped glass fibers by weight were tested, the impact fatigue strength was found in all instances more than double.

It is an object of this invention to provide a process for molding polycarbonate parts having enhanced impact fatigue characteristics. It is a further object of the invention to provide a method for fabricating molded parts in which such enhanced impact fatigue characteristics are permanently imparted within the entire normal operating range of temperatures.

Moldable polycarbonates sometimes identified as bisphenol-A polycarbonates commonly formed from reacting bisphenol-A with phosgene or with diphenyl carbonate find a rapidly growing field of application for molded parts. This material is more completely described in "Polycarbonates" by William F. Christopher and Daniel W. Fox, Reinholt Publishing Corporation 1962. Comparative advantages are achieved by this material over other thermoplastic materials in such characteristics as: moldability to close tolerances and dimensional stability in use, good electrical resistance, heat resistance and self extinguishing characteristics, strength and modulus, high impact strength and toughness, and the ability to maintain properties over a wide temperature range.

In studies of impact fatigue strength of these materials, it has been sought to improve the resistance to repeated impact loading and to extend the applicability to structural parts subjected to cyclic mechanical loading.

Polycarbonate material can be molded successfully using mold temperatures as high as 350° F. Although it is impossible to use a room temperature mold it has been found more satisfactory to heat the mold to a temperature of 175° to 200° F. and in some applications better part quality is achieved by further increasing the mold temperature.

In the present invention a part was molded having a 1.1 inch projection of square cross section with 0.376 inch dimensions projecting from an enlarged portion. In subsequent fatigue tests, the enlarged portion was clamped in position and a repeated impact load of known magnitude applied to the cantilevered projection at a frequency of 1,800 cycles per minute until catastrophic fracture occurred.

The molding operation was accomplished using a mold thermostatically maintained at an elevated temperature, commonly in the range of 250° F., by circulating heated oil through heat exchange channels within the die set. Upon completion of the molding cycle, the mold is opened and the ejected part immediately immersed in a quenching bath of ice water at 0° to 5° C. wherein it remains until the entire cross section has been reduced in temperature. The quenching may result in an increase in weight due to about 0.15 percent moisture absorption; however, this is dissipated within 48 hours and the part returns to the normal weight. This quenching operation could also be accomplished using other liquids in the bath so long as such liquid is compatible with the part. Such liquid would not react with or dissolve the part.

Subsequent impact fatigue tests indicate a substantial upgrading of the fatigue characteristic of quenched parts, which characteristic is permanently retained by the part even in operating temperature environments of 150° F.

EXAMPLE I

An elongated part having a cross section of 0.376 inches square and a length of 1.1 inches extending from an enlarged section is formed within a mold maintained at 250° F. The part is formed of bisphenol-A polycarbonate heated to a temperature of 570° F. and injected into the mold cavity using a 1,000 pound force. The part is allowed to remain in the mold for 90 seconds. Following opening of the mold, the part is removed and immediately quenched in ice water 0° to 3° C. for a period of 15 minutes, calculated to assure thorough cooling of the entire part cross section.

These parts are identified as quenched. One series of parts, identified as molded parts, were made by the same process with the exception of the quenching step. Following the mold cycle the parts were removed and placed in a compartmented corrugated container and allowed to cool to room temperature in accordance with the normal molding process. Alternate parts, identified as quenched parts, were quenched as described above.

The parts thus fabricated were tested for impact fatigue strength with results as indicated in the following table:

| Force of Impact | Number of Impacts Prior to | Fracture |
|---|---|---|
| in Lbs. | Molded Parts | Quenched Parts |
| 46.3 | 9,100 | 89,000 |
| 38.5 | 24,000 | 310,000 |
| 26 | 235,000 | 3,000,000 |
| 20 | 773,000 | 13,000,000 |

EXAMPLE II

A series of parts were fabricated in accordance with the process of Example I using a molding compound of biphenol-A polycarbonate containing 30 percent by weight of chopped glass fibers.

Parts fabricated of this glass filled polycarbonate material when subjected to fatigue testing yielded results as indicated in the following table:

| Force of Impact | Number of Impacts Prior to | Fracture |
|---|---|---|
| in Lbs. | Molded Parts | Quenched Parts |
| 30 | 16,600 | 39,600 |
| 25 | 59,000 | 254,000 |
| 22.5 | 387,000 | 830,000 |
| 20 | 896,000 | 3,340,000 |
| 17.8 | 4,250,000 | 15,000,000 |

What is claimed is:
1. A method of forming moldable polycarbonate into an impact fatigue resistant part comprising:
    injecting polycarbonate material into a mold cavity which has been preheated to a temperature in excess of 175° F., and immediately upon removal from said mold cavity, quenching the part formed therein in a water bath having a temperature not exceeding 10° Centigrade.

2. The method of claim 1 wherein the mold cavity into which the polycarbonate material is injected is preheated to and maintained at a predetermined temperature between 200° and 350° F., and said water bath is maintained at a temperature between 0° and 5° C.

3. The method of claim 2 wherein the polycarbonate material comprises a bisphenol-A polycarbonate resin containing a filler of chopped glass fibers.

* * * * *